(12) United States Patent
Mufti et al.

(10) Patent No.: US 11,196,731 B2
(45) Date of Patent: Dec. 7, 2021

(54) NETWORK-AUTHENTICATION CONTROL

(71) Applicant: T-Mobile USA, Inc., Bellevue, WA (US)

(72) Inventors: Shujaur Rehman Mufti, Snoqualmie, WA (US); Saqib Badar, Bellevue, WA (US); Zeeshan Jahangir, Snoqualmie, WA (US); Khurram Ahmad Mirza, Bellevue, WA (US); Anselmo Myungsup Shim, Spanaway, WA (US); Muhammad Ejaz Sial, Monroe, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 95 days.

(21) Appl. No.: 16/576,180

(22) Filed: Sep. 19, 2019

(65) Prior Publication Data

US 2021/0006549 A1    Jan. 7, 2021

Related U.S. Application Data

(60) Provisional application No. 62/868,306, filed on Jun. 28, 2019.

(51) Int. Cl.
*H04L 29/06*    (2006.01)

(52) U.S. Cl.
CPC .............. *H04L 63/08* (2013.01); *H04L 63/10* (2013.01)

(58) Field of Classification Search
CPC ................................ H04L 63/08; H04L 63/10
See application file for complete search history.

(56) References Cited

U.S. PATENT DOCUMENTS

| | | | |
|---|---|---|---|
| 6,928,277 B1* | 8/2005 | Ene ..................... | H04W 12/069 455/411 |
| 9,396,316 B1* | 7/2016 | Altman ................. | H04L 63/102 |
| 9,641,880 B1* | 5/2017 | Scurtu .................. | H04N 21/485 |
| 9,875,344 B1* | 1/2018 | Hughes .................... | G06F 21/12 |
| 10,169,587 B1* | 1/2019 | Nix .......................... | G06F 21/57 |
| 10,277,576 B1* | 4/2019 | Yau ........................ | H04L 9/3236 |

(Continued)

OTHER PUBLICATIONS

Extended European Search Report dated Aug. 25, 2020 for European Patent Application No. 20176651.6, 8 pages.

*Primary Examiner* — Aravind K Moorthy
(74) *Attorney, Agent, or Firm* — Lee & Hayes, P.C.

(57) ABSTRACT

In some examples, an authentication node of a telecommunications network can receive an authentication request from a terminal, and an authentication-control message. The authentication node can skip an authentication operation with respect to the authentication request in response to the authentication-control message. In some examples, a relay node of the telecommunications network can detect an overload or service-interruption condition and determine, in response, the authentication-control message. The relay node can send the authentication-control message to the authentication node. In some examples, an authentication node can detect that its load level satisfies a predetermined criterion and, in response, skip an authentication operation and send a first message. Another authentication node can receive an indication of the first message and, in response, perform a second authentication operation.

18 Claims, 6 Drawing Sheets

(56) References Cited

U.S. PATENT DOCUMENTS

| | | | |
|---|---|---|---|
| 2001/0028660 A1* | 10/2001 | Carolan | H04L 63/108 370/466 |
| 2003/0187998 A1* | 10/2003 | Petit | H04L 69/329 709/229 |
| 2005/0154914 A1* | 7/2005 | Eguchi | G06F 21/35 726/4 |
| 2006/0129814 A1* | 6/2006 | Eun | H04L 9/3236 713/168 |
| 2008/0089294 A1* | 4/2008 | Shon | H04W 12/069 370/331 |
| 2009/0119509 A1* | 5/2009 | Cho | H04L 63/205 713/171 |
| 2009/0144548 A1* | 6/2009 | Tzavidas | H04L 9/3242 713/169 |
| 2009/0191847 A1* | 7/2009 | Na | H04L 9/321 455/411 |
| 2009/0265776 A1* | 10/2009 | Baentsch | H04L 63/0853 726/9 |
| 2010/0142764 A1* | 6/2010 | Ikegami | G06K 9/00926 382/115 |
| 2010/0169952 A1 | 7/2010 | Maki et al. | |
| 2011/0231443 A1* | 9/2011 | Hannel | H04L 63/20 707/776 |
| 2012/0011569 A1* | 1/2012 | Chou | H04L 9/0637 726/4 |
| 2012/0180119 A1* | 7/2012 | Bessis | H04L 9/3271 726/11 |
| 2012/0213368 A1* | 8/2012 | Falk | H04L 9/3236 380/270 |
| 2012/0331164 A1* | 12/2012 | Wang | H04L 67/1012 709/229 |
| 2013/0046983 A1* | 2/2013 | Zhu | H04L 9/085 713/171 |
| 2014/0258724 A1* | 9/2014 | Lambert | H04W 12/04 713/170 |
| 2015/0180829 A1* | 6/2015 | Yu | H04L 63/0853 726/11 |
| 2015/0281241 A1* | 10/2015 | Sharma | H04L 63/10 726/9 |
| 2015/0326539 A1* | 11/2015 | Sharma | H04L 9/0838 713/168 |
| 2016/0021067 A1* | 1/2016 | Liu | H04L 63/0428 713/168 |
| 2016/0044531 A1* | 2/2016 | Papa | H04W 28/0247 370/230 |
| 2016/0248586 A1* | 8/2016 | Hughes | H04L 63/08 |
| 2016/0323312 A1* | 11/2016 | Voelker | H04L 63/08 |
| 2016/0352729 A1* | 12/2016 | Malik | H04L 63/08 |
| 2017/0070881 A1* | 3/2017 | Sun | H04L 63/06 |
| 2017/0180385 A1* | 6/2017 | Gonzales, Jr. | G06Q 20/405 |
| 2017/0318002 A1* | 11/2017 | Okamura | H04L 9/3239 |
| 2018/0083782 A1* | 3/2018 | Barry | H04L 9/0618 |
| 2018/0324209 A1* | 11/2018 | Zhang | H04L 63/0892 |
| 2019/0036736 A1* | 1/2019 | Gao | H04L 61/6022 |
| 2019/0075102 A1* | 3/2019 | Kim | H04L 9/3239 |
| 2019/0102540 A1* | 4/2019 | Acar | G06F 21/53 |
| 2019/0288975 A1* | 9/2019 | Hara | G06F 13/00 |
| 2019/0318355 A1* | 10/2019 | Chopra | G06K 7/1417 |
| 2019/0363815 A1* | 11/2019 | Bogenberger | G06F 1/14 |
| 2019/0392450 A1* | 12/2019 | Gosset | G06Q 20/401 |
| 2020/0202683 A1* | 6/2020 | Gao | G06Q 20/18 |
| 2020/0204553 A1* | 6/2020 | Morales-Charlier | G06Q 40/00 |
| 2020/0351261 A1* | 11/2020 | Milton | H04L 63/20 |

* cited by examiner

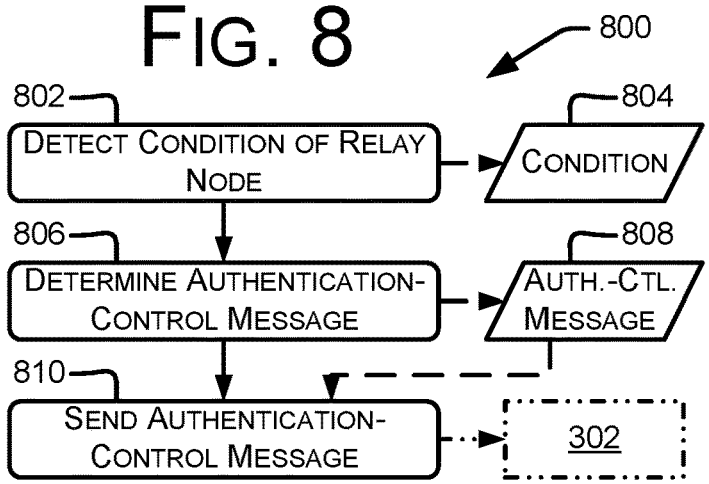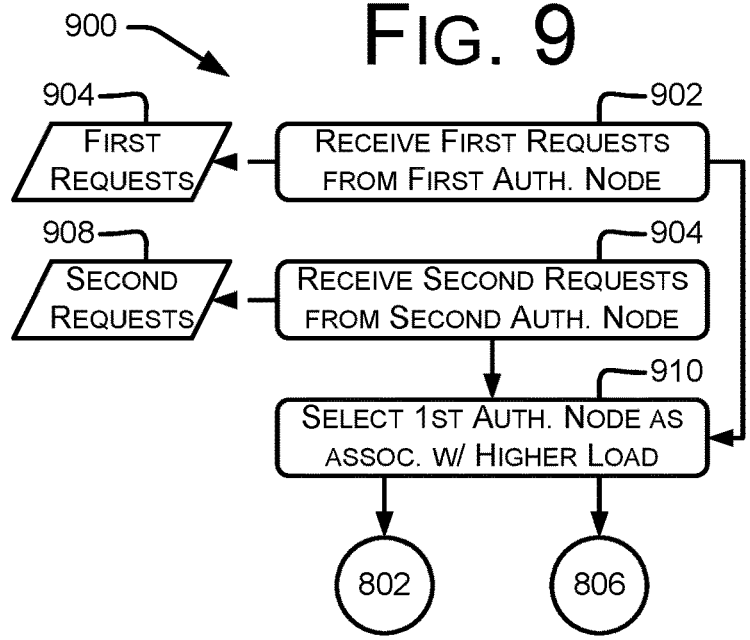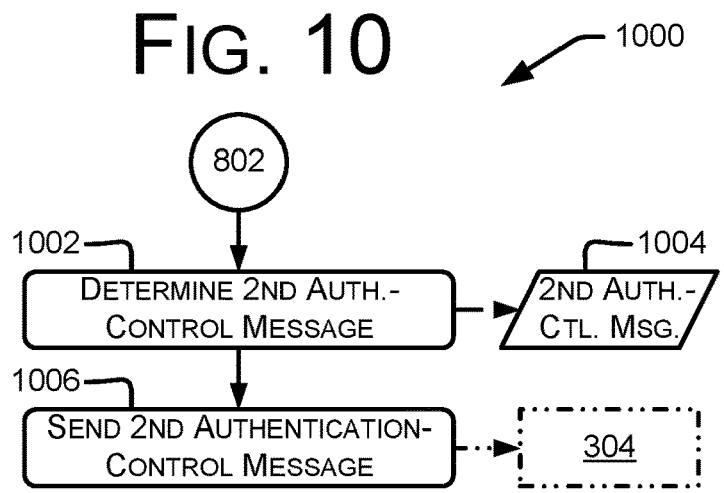

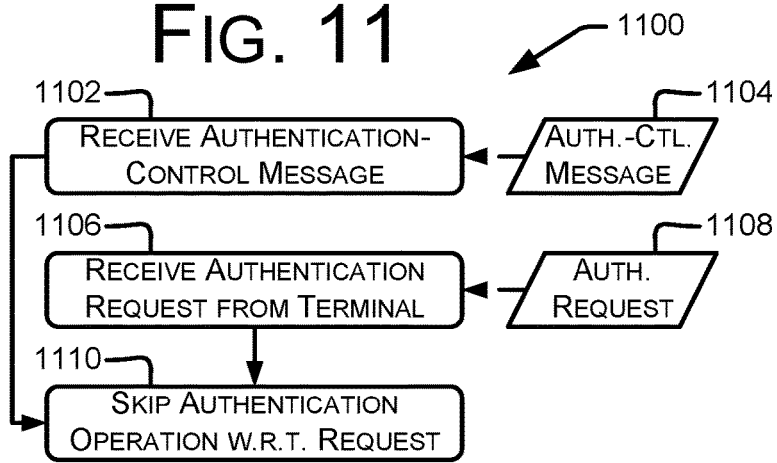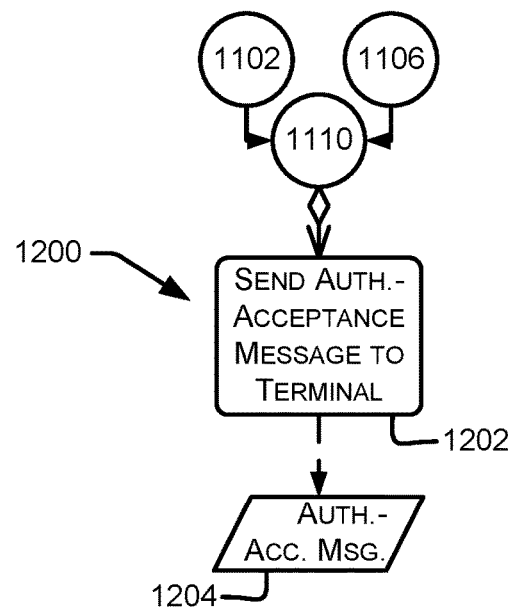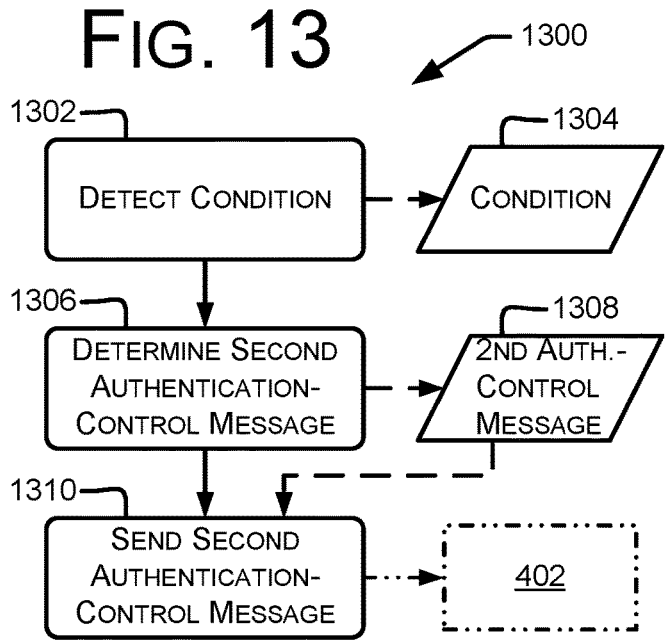

NETWORK-AUTHENTICATION CONTROL

CROSS-REFERENCE TO RELATED APPLICATIONS

This application is a nonprovisional application of, and claims priority to and the benefit of, U.S. Patent Application Ser. No. 62/868,306, filed Jun. 28, 2019, and entitled "Network-Authentication Control," the entirety of which is incorporated herein by reference.

BACKGROUND

In fifth-generation (5G) and other cellular systems, terminals such as cell phones generally connect to an access network such as a Long Term Evolution (LTE) or 5G New Radio (NR). Terminals communicate via the access network with an application network, e.g., an Internet Protocol (IP) Multimedia Subsystem (IMS), that provides network services. Terminals are generally authenticated in the access network and the application network. Natural disasters, network congestion, or network-device failure can trigger a large number of concurrent authentication requests from terminals to the access or application networks.

BRIEF DESCRIPTION OF THE DRAWINGS

Objects, features, and advantages of various examples will become more apparent when taken in conjunction with the following description and drawings wherein identical reference numerals have been used, where possible, to designate identical features that are common to the figures. The attached drawings are for purposes of illustration and are not necessarily to scale. For brevity of illustration, in the diagrams herein, an arrow beginning with a diamond connects a first component or operation (at the diamond end) to at least one second component or operation that is or can be included in the first component or operation.

FIG. 8 is a dataflow diagram illustrating an example technique (e.g., at a relay node) for responding to node conditions (e.g., overload or service interruption), and related data items, according to various examples.

FIG. 9 is a dataflow diagram illustrating example techniques (e.g., at a relay node) for selecting an authentication node, and related data items, according to various examples.

FIG. 10 is a dataflow diagram illustrating example techniques (e.g., at a relay node) for coordinating authentication across multiple nodes, and related data items, according to various examples.

FIG. 11 is a dataflow diagram illustrating an example technique (e.g., at an authentication node) for processing an authentication request from a terminal based on an authentication-control message, and related data items, according to various examples.

FIG. 12 is a dataflow diagram illustrating example techniques (e.g., at an authentication node) for processing authentication requests, and related data items, according to various examples.

FIG. 13 is a dataflow diagram illustrating example techniques (e.g., at an authentication node) for controlling authentication, and related data items, according to various examples.

DETAILED DESCRIPTION

Overview

Figure 1:
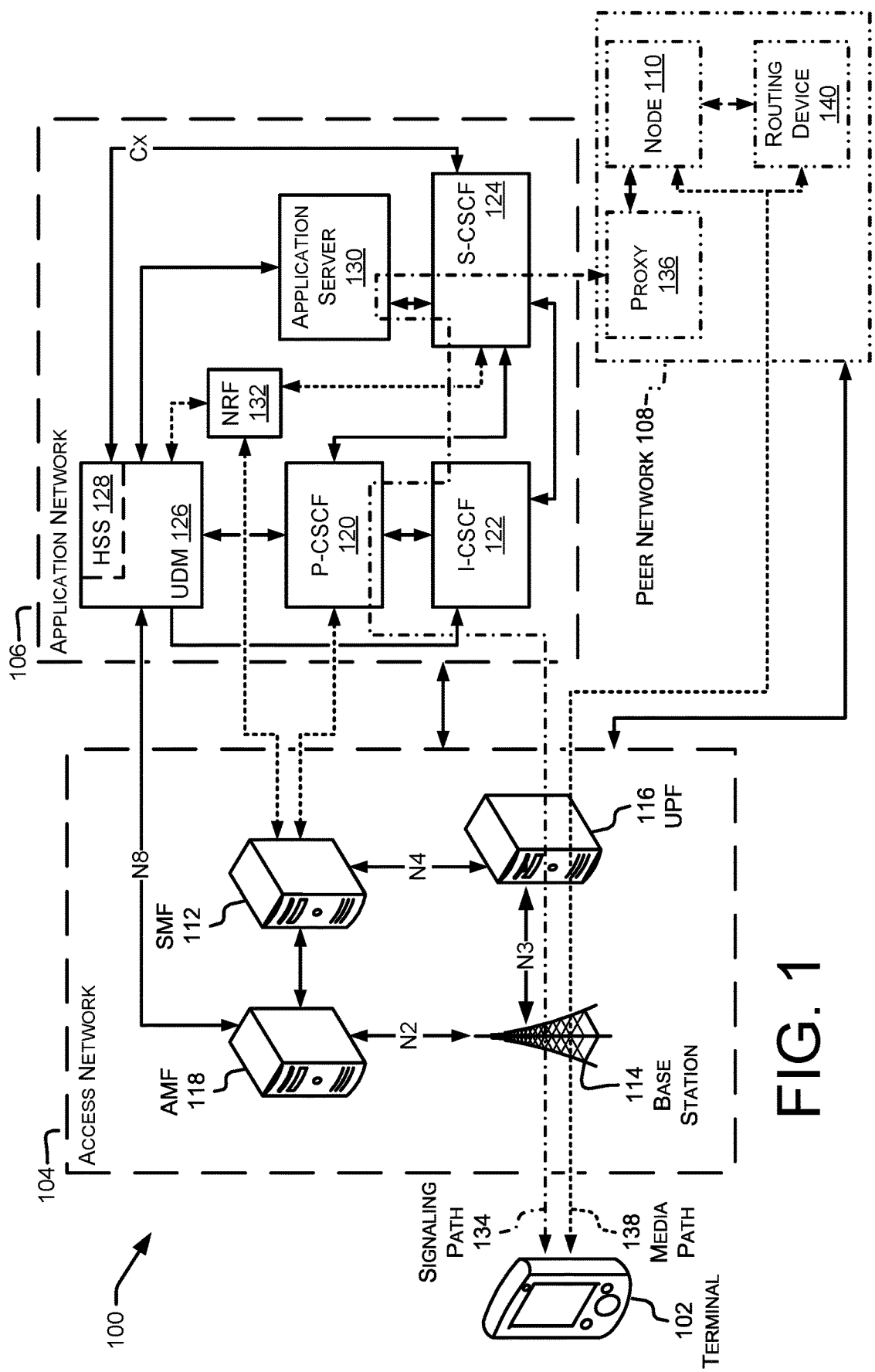
FIG. 1 illustrates an overview of nodes and devices involved in authenticating terminals to a network.

Terminals generally authenticate separately to an access network and an application network. For example, a terminal can authenticate to a Mobility Management Entity (MME) of a fourth-generation (4G) LTE access network, or to an Access Management Function (AMF) of a 5G NR access network. Events that disrupt connectivity for multiple terminals (such as those mentioned above) can trigger a large number of concurrent authentication or re-authentication requests from terminals to the access network and the application network. Even absent such an event, mobility of large numbers of terminals (e.g., a crowd leaving a venue after an event) can trigger a large number of mobility registration update messages in a relatively short amount of time. In some prior schemes, network congestion from such request floods can cause terminals to be disconnected or sessions to be dropped in the access network or the application network. For example, the number of requests at an MME may exceed that MME's capacity.

In some prior schemes, an AMF authenticates a terminal using 3GPP Authentication and Key Agreement (AKA) protocols and authorizes the terminal based on access-control subscription information stored in a 5G Access Layer. A call session control function (CSCF), such as an interrogating CSCF (I-CSCF) or serving CSCF (S-CSCF), then authorizes and authenticates (e.g., using 3GPP AKA) the terminal again on the SIP Layer for subscriptions to IMS services. A proxy CSCF (P-CSCF) and the terminal can then negotiate and establish a security association (SA). After registration is complete, the terminal performs periodic registration refresh operations, which can include authentication towards the AMF and S-CSCF. During registration refreshes in the IMS Core, the terminal-to-P-CSCF SAs are re-negotiated. In certain mobility cases, the terminal also performs a registration refresh, including authentication towards the AMF and S-CSCF. Accordingly, in these prior schemes, multi-layer authentication and authorization generates significant traffic to and from the AMF, Unified Data Management (UDM), I-CSCF, and S-CSCF.

Some examples herein, by contrast, permit selectively skipping disabling some authentication operations to reduce network load. In some examples herein, under high-load conditions, terminals can be permitted to use network services after authorizing to only one of the access network and the application network, instead of to both. This can reduce network load, both in requests/s and in traffic volume. The access network and the application network can communicate to determine which of those networks will require authentication from terminals. Communication can be direct or via an intermediate node such as a Home Subscriber Server (HSS) or UDM node. In some examples, even if the load is not high, permitting terminals to use network services after authorizing to only one of the access network and the application network can reduce the complexity of network implementation, which can permit deploying networks in resource-constrained environments that might otherwise be unable to support a deployment.

Various examples manipulate interactions, e.g., requests for authentication (including requests for re-authentication, and likewise throughout the remainder of this document) and corresponding responses, to yield a desired result that is other than the routine and conventional sequence of events. In some prior schemes, terminals would be required to authenticate to both access and application networks. Various examples herein handle overload by reducing the extent to which access- or application-network authentication nodes engage in authentication-related communication with terminals. Various examples reduce the negative effects of network-function overload and increase network robustness. Various examples permit reducing load without changing the terminals themselves.

Throughout this discussion, references to a single NF, e.g., a Network Resource Function (NRF), also encompass multiple NFs or NRFs arranged so that one of the NFs is active and the other(s) is (are) hot spares or other standby/backup nodes. In some examples, synchronization protocols such as rsync are used between active and standby nodes.

Example embodiments described or shown herein are provided for purposes of example only. Statements made herein may be specific to a particular example embodiment (e.g., "use case"), or a specific aspect of that example embodiment, and should not be construed as limiting other example embodiments described herein. Features described with regard to one type of example embodiment may be applicable to other types of example embodiments as well. The features discussed herein are not limited to the specific usage scenarios with respect to which they are discussed. Subsection headers in this Detailed Description are solely for convenience in reading. Some examples include features from only one subsection. Some examples include features from more than one subsection.

Throughout this description, some aspects are described in terms that would ordinarily be implemented as software programs. Those skilled in the art will readily recognize that the equivalent of such software can also be constructed in hardware, firmware, or micro-code. The present description is directed in particular to algorithms and systems forming part of, or cooperating more directly with, systems and methods described herein. Aspects not specifically shown or described herein of such algorithms and systems, and hardware or software for producing and otherwise processing signals or data involved therewith, can be selected from systems, algorithms, components, and elements known in the art.

Some example systems and techniques described herein can permit computing devices to communicate via telecommunications networks. The term "session" as used herein includes a communications path via at least one telecommunications network for exchange of data among two or more computing devices, referred to for brevity as "terminals." Example sessions include voice and video calls, e.g., by which human beings converse, a data communication session, e.g., between two electronic systems or between an electronic system and a human being, or a Rich Communication Services (RCS) session.

As used herein, the term "unique identifier" and similar terms encompass both truly unique identifiers (e.g., Ethernet MAC addresses that are unique by construction, or Version 1 UUIDs) and identifiers with a negligible probability of collision (non-uniqueness) (e.g., SHA256 hashes of data uniquely identifying an object, or Version 4 UUIDs).

As used herein, a "random" value can be a truly random value, e.g., measured from physical phenomena, or a pseudorandom value. Examples of random values include cryptographically-strong random numbers.

As used herein, a message "sent to," "transmitted to," or "transmitted toward" a destination, or similar terms, can be sent directly to the destination, or can be sent via one or more intermediate network nodes or devices to the destination. Similarly, a message "received from" a destination can be received directly from the destination, or can be received via one or more intermediate network nodes or devices from the destination. A message passing through one or more intermediate network nodes or devices can be modified by those network nodes or devices, e.g., by adding or removing framing, or by changing a presentation of at least part of the message, e.g., from a Session Initiation Protocol (SIP) start-line to a SIP header or vice versa. As used herein, a "reply" message is synonymous with a "response" message. The term "reply" is used for clarity, e.g., when discussing reply messages sent in response to the receipt of messages. The phrase "communicatively connected" includes any type of connection, wired or wireless, for communicating data between devices or processors. These devices or processors can be located in physical proximity or not.

This "Overview" section is intended only to provide a brief overview of subject matter disclosed herein according to one or more illustrative embodiments, and does not serve as a guide to interpreting the claims or to define or limit scope. This section is provided to introduce illustrative features in a simplified form; these features are further described below. This section is not intended to identify key features or essential features of the claimed subject matter, nor is it intended to be used as an aid in determining the scope of the claimed subject matter. The claimed subject matter is not limited to implementations that solve any or all disadvantages noted above. The claimed subject matter is not limited to implementations that provide at least one of the results listed herein.

Illustrative Examples

FIG. 1 illustrates an example telecommunication system 100, e.g., a 5G system. Terminal 102, e.g., user equipment, communicates with access network 104 of the telecommunication system 100. Access network 104 is shown as an NR access network. However, access network 104 can represent any type of access network including components performing functions described herein, e.g., an LTE access network or a non-3GPP access network such as a WIFI network. In some examples, voice calls can be carried over access network 104 using VoNR or other Vo5G (voice over 5G) configurations, such as voice over LTE (VoLTE) in non-standalone (NSA) NR deployments.

Also shown is application network 106 of telecommunication system 100, in this example an IMS application network. Application network 106 communicates with access network 104 and provides media-handling services, e.g., to route video or voice data. For example, application network 106 can provide services permitting terminal 102 to communicate with peer telecommunications network 108 (shown in phantom), e.g., with a node 110 thereof, such as a server or terminal. Peer network 108 can be operated by the same operator as application network 106 or by a different operator. For example, application network 106 and peer network 108 can be two IMSes operated by the same operator, or IMSes operated by respective, different operators. In some examples, peer network 108 is a PSTN or a 2G, 3G, or LTE cellular network. In some examples, peer network 108 is the Internet or another packet network.

In the illustrated example, access network 104 includes SMF 112. Access network 104 includes a base station 114, e.g., an NR gNodeB or an LTE eNodeB. Base station 114 can additionally or alternatively include a non-3GPP-access interworking function (N3IWF), a WIFI wireless access point (WAP), or another access point that provides connectivity to access network 104. In the illustrated example, access network 104 also includes an NR UPF 116, which can be an example of a packet gateway. UPF 116 can convey traffic between terminal 102 and networks outside access network 104, e.g., application network 106 or peer network 108. UPF 116 can represent or include a routing device such as a router, switch, or gateway.

Access network 104 can also include an AMF 118, which can represent an authentication node or other device responsible for authorizing terminals to attach to, or use service(s) provided by, access network 104. Access network 104 can include more than one of any of the illustrated components, or can include other components not shown.

In the illustrated example, application network 106 includes a P-CSCF 120. Application network 106 also includes an I-CSCF 122 and a S-CSCF 124, either of which can be an example of an authentication node, and a UDM 126, which can be an example of a relay node. In some examples, UDM 126 can include a Unified Data Repository (UDR) subsystem. In some examples, UDM 126 can represent a UDM and can be connected to a separate UDR. In the illustrated example, UDM 126 can include a subsystem performing functions of an HSS 128, or can include or be communicatively connected with an HSS 128. UDM 126, HSS 128, and other illustrated components of application network 106 can perform functions described in 3GPP or other pertinent specifications. In some examples, UDM 126 or HSS 128 can additionally or alternatively perform functions described herein, e.g., with reference to relay node 402 and FIGS. 4,6, and 8-10. In some examples, AMF 118, an MME, or I-CSCF 122, S-CSCF 124, or another CSCF can additionally or alternatively perform functions described herein, e.g., with reference to FIGS. 3-5, 7, and 11-14.

Application network 106 also includes an application server (AS) 130. In some examples, the AS 130 is an anchoring network device and proxies signaling traffic for a communication session, e.g., operating as a SIP proxy or back-to-back user agent (B2BUA). The AS 130 (or other anchoring network device, and likewise throughout) can provide session-control services to terminal 102. The UDM 126 can communicate with AMF 118, I-CSCF 122, S-CSCF 124, or other illustrated components.

In various examples, access network 104 or application network 106 can include an NRF 132. NRF 132 can be an example of a relay node, or can be connected to a relay node. NRF 132 can provide service-discovery functions, e.g., in a 5G core (5GC) network of access network 104. Additionally, or alternatively, NRF 132 can provide message-routing functions.

In the illustrated example, a signaling path 134 of a communication session passes through base station 114 and UPF 116 in access network 104, and then through P-CSCF 120, I-CSCF 122, S-CSCF 124, and AS 130 in application network 106, as indicated by the dash-dot arrow (in some other examples, I-CSCF 122 is omitted or bypassed). After AS 130, the example signaling path passes back through S-CSCF 124 to a network node of peer network 108, shown as a proxy 136. Proxy 136 can include, e.g., an S-CSCF, I-CSCF, or BGCF.

In the illustrated example, a media path 138 of the communication session passes through base station 114 and UPF 116 in access network 104. UPF 116 forwards the traffic to or from peer network 108. In the illustrated example, traffic between terminal 102 and node 110 is exchanged between UPF 116 and a peer routing device 140 of peer network 108.

Although peer network 108 and its components are shown in phantom, in some examples not depicted, at least one component of peer network 108 can be part of telecommunication system 100. Moreover, in other examples not depicted, one or both of proxy 136 and peer routing device 140 may not be present. In some examples, peer network 108 is the Internet, node 110 is a non-IMS-connected device, and UPF 116 exchanges traffic directly with node 110. This can support low-latency use cases such as real-time messaging, computer-mediated competition, or over-the-top (OTT) video calling.

In some examples not shown, access network 104 is an LTE access network. In some of these examples, base station 114 includes an eNodeB and access network 104 includes an MME in place of AMF 118. In some examples, UDM 126 includes an HSS 128 subsystem or is otherwise configured to perform HSS 128 functions, or an HSS 128 is used in place of UDM 126.

The devices and networks of FIG. 1 may cooperate to manage authentication as described herein. They may also cooperate to accomplish the initiation of a communication session of terminal 102. Techniques described herein with respect to originating communication sessions can also be used for receiving (terminating) sessions or for exchanging messages sent during an established phase of a communication session, in some examples. Some examples herein include fewer than all of the illustrated devices, or include other devices not shown.

Example cellular access networks 104 can include a GSM or UMTS network; a universal terrestrial radio network (UTRAN) or an GSM Enhanced Data rates for GSM Evolution (EDGE) radio access network (GERAN); an E-UTRAN (e.g., LTE); an Evolution-Data Optimized (EVDO), Advanced LTE (LTE+), Generic Access Network (GAN), Unlicensed Mobile Access (UMA), GPRS, EDGE, High Speed Packet Access (HSPA), or evolved HSPA (HSPA+) network. Example non-cellular access networks 104 can include a WIFI (IEEE 802.11), BLUETOOTH (IEEE 802.15.1), or other local-area network (LAN) or personal-area network (PAN) access networks, e.g., in the IEEE 802.1* family, a satellite or terrestrial wide-area access network such as a wireless microwave access (WIMAX) network, a wired network such as the PSTN, an optical network such as a Synchronous Optical NETwork (SONET), or other fixed wireless or non-wireless networks such as Asynchronous Transfer Mode (ATM) or Ethernet, e.g., configured to transport IP packets, e.g., IPv4, IPv6, or any other evolution of an IP-based technology. A cellular network or a wireless data network may use any sort of air interface, such as a code division multiple access (CDMA), time division multiple access (TDMA), frequency division multiple access (FDMA), or orthogonal frequency division multiple access (OFDMA) air interface.

The telecommunication system 100 may also include a number of devices or nodes not illustrated in FIG. 1. Nonlimiting examples of such devices or nodes include an Access Transfer Gateway (ATGW), a serving GPRS support node (SGSN), a gateway GPRS support node (GGSN), a session border controller (SBC), a visitor location register (VLR), an ISBC or IBCF, a BGCF, or a media gateway (MGW), or LTE components such as a P-GW or an S-GW. Similarly, throughout this disclosure, other nodes or devices can be used in conjunction with listed nodes or devices. For example, a telecommunications network can include many application network nodes or devices, only some of which implement functions described herein for application network nodes or devices. Application network 106 may further include a number of devices or nodes not illustrated in FIG. 1, such as a presence server and one or more additional CSCFs. A core network of the access network 104 may be a GPRS core network or an evolved packet core (EPC) network, or may include elements from both types of core networks.

Illustrative Systems

Figure 2:
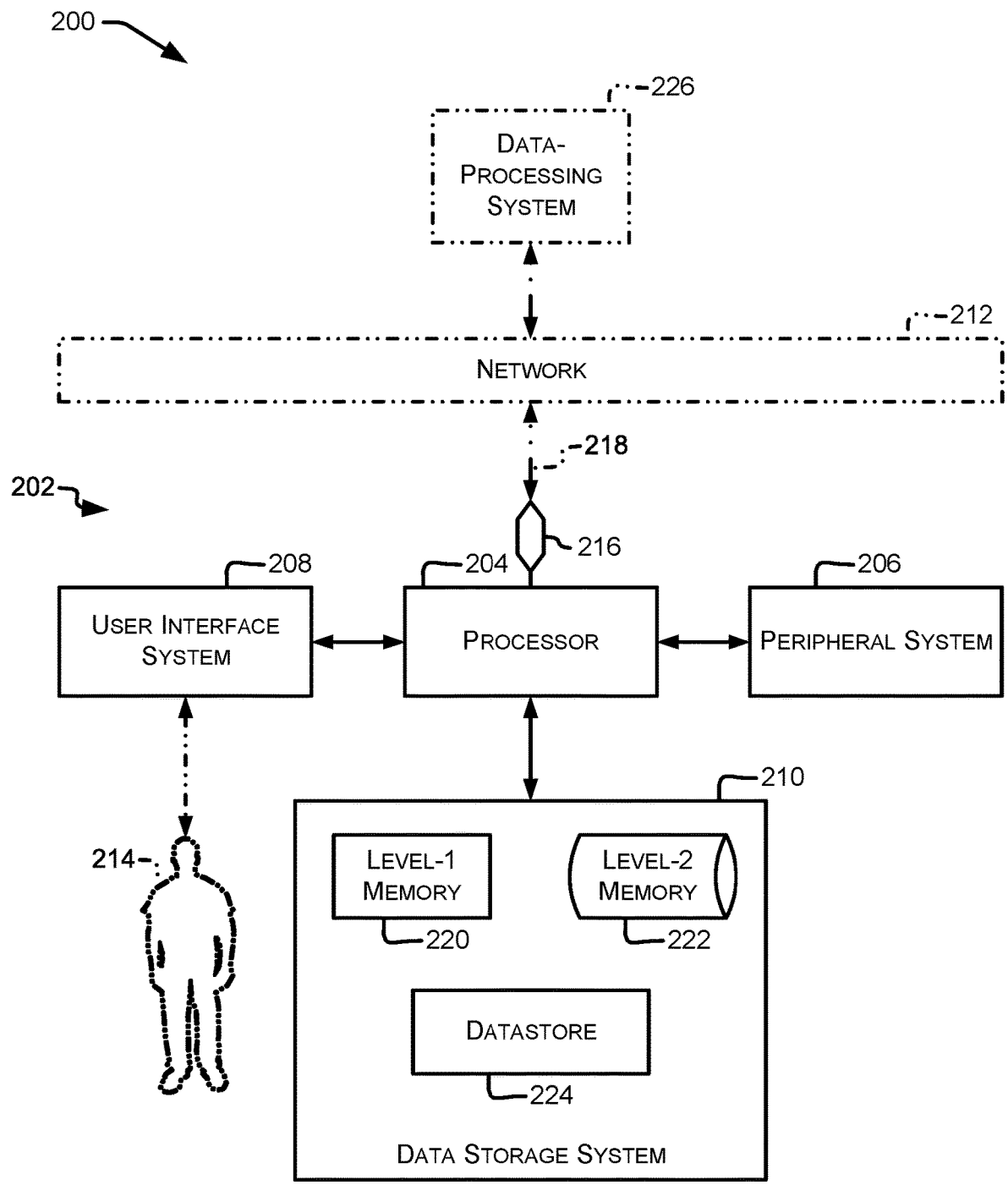
FIG. 2 is a high-level diagram showing the components of a computing system.

FIG. 2 is a high-level diagram 200 showing the components of an example computing system 202 for analyzing data and performing other analyses described herein, and related components. The system 202 includes a processor 204, a peripheral system 206, a user interface system 208, and a data storage system 210. The peripheral system 206, the user interface system 208, and the data storage system 210 are communicatively connected to the processor 204. Processor 204 can be communicatively connected to network 212 (shown in phantom), e.g., the Internet, a leased line, or a cellular network, as discussed below. Network 212 can be an example of an internetwork, such as the public Internet or a private IPX network. Terminals, nodes of a serving network, nodes of a home network, or other network nodes described herein can each include one or more of subsystems 204, 206, 208, 210, and can each connect to one or more network(s) 212. Processor 204, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Telecommunications networks, such as network 212 or a component thereof, may include an application network (e.g., an Internet Protocol, IP, Multimedia Subsystem, IMS, network) or a core network (e.g., a 5G core) operated by one or more service providers ("carriers"), such as one or more cellular-telephony providers. The application network can be connected via access networks, e.g., a serving network or a home network, to terminals. Terminals can be operated by users ("subscribers"), or can be autonomous. Examples of networks 212 are described herein with reference to FIG. 1.

Processor 204 can implement techniques according to various aspects described herein. Processor 204 and related components can, e.g., carry out techniques for detecting overload or other negative operational conditions, requesting or directing changes in authentication behavior, or performing other functions described herein.

Processor 204 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise.

The phrase "communicatively connected" includes any type of connection, wired or wireless, for communicating data between devices or processors. These devices or processors can be located in physical proximity or not. For example, subsystems such as peripheral system 206, user interface system 208, and data storage system 210 are shown separately from the processor 204 but can be stored completely or partially within the processor 204.

The peripheral system 206 can include or be communicatively connected with one or more devices configured or otherwise adapted to provide digital content records to the processor 204 or to take action in response to processor 204. For example, the peripheral system 206 can include digital still cameras, digital video cameras, cellular phones, or other data processors. The processor 204, upon receipt of digital content records from a device in the peripheral system 206, can store such digital content records in the data storage system 210.

The user interface system 208 can convey information in either direction, or in both directions, between a user 214 (shown in phantom) and the processor 204 or other components of system 202. The user interface system 208 can include a mouse, a keyboard, another computer (connected, e.g., via a network or a null-modem cable), or any device or combination of devices from which data is input to the processor 204. The user interface system 208 also can include a display device, a processor-accessible memory, or any device or combination of devices to which data is output by the processor 204. The user interface system 208 and the data storage system 210 can share a processor-accessible memory.

In various aspects, processor 204 includes or is connected to network interface 216 that is coupled via network link 218 (shown in phantom) to network 212. Network link 218 can include a wired or wireless communication connection. For example, network interface 216 can include an integrated services digital network (ISDN) terminal adapter or a modem to communicate data via a telephone line; a network interface to communicate data via a LAN, e.g., an Ethernet LAN, or wide-area network (WAN); or a radio to communicate data via a wireless link, e.g., WIFI or GSM. Network interface 216 sends and receives electrical, electromagnetic, or optical signals that carry digital or analog data streams representing various types of information across network link 218 to network 212. Network link 218 can be connected to network 212 via a switch, gateway, hub, router, or other networking device.

Network interface 216 can be an example of a communications interface. Other examples of communications interfaces include bus transceivers; DDR memory-bus controllers (e.g., for DMA transfers to a network card installed in a server); or any number of network, bus, memory, or register-file interfaces, in any combination, whether packaged together or separately. In some nonlimiting examples, a communications interface consists of a network interface. A bus communications interface can include, e.g., an expansion-card bus interface (e.g., PCI Express), a display bus interface (e.g., HDMI or DISPLAYPORT), or a peripheral-device bus interface, e.g., Universal Serial Bus (USB) or THUNDERBOLT. In some examples, a communications interface can include a memory bus internal to a particular computing system 202, transmitting or providing data via the communications interface can include storing the data in data storage system 210, and receiving via the communications interface can include retrieving data from data storage system 210. In some examples, a communications interface can include a datapath providing a connection to a register file within a processor. For example, a first software module can load parameters into the register file via the datapath, and then and issue a function call to a second software module. The second software module can retrieve the parameters from the register file and return a result via the register file.

In some examples, the communications interface can include, but is not limited to, a transceiver for cellular (3G, 4G, or other), WI-FI, Ultra-wideband (UWB), BLUETOOTH, or satellite transmissions. The communications interface can include a wired I/O interface, such as an Ethernet interface, a serial interface, a USB interface, an INFINIBAND interface, or other wired interfaces. The communications interface can additionally or alternatively include at least one user-interface device or user interface, at least one bus such as a memory bus, datapath, or local bus, at least one memory interface, or at least one hardwired interface such as a 0-20 mA control line.

Processor 204 can send messages and receive data, including program code, through network 212, network link 218, and network interface 216. For example, a server can store requested code for an application program (e.g., a JAVA applet) on a tangible non-volatile computer-readable storage medium to which it is connected. The server can retrieve the code from the medium and transmit it through network 212 to network interface 216. The received code can be executed by processor 204 as it is received, or stored in data storage system 210 for later execution.

Data storage system 210 can include or be communicatively connected with one or more processor-accessible memories configured or otherwise adapted to store information. The memories can be, e.g., within a chassis or as parts of a distributed system. The phrase "processor-accessible memory" is intended to include any data storage device to or from which processor 204 can transfer data (using appropriate components of peripheral system 206), whether volatile or nonvolatile; removable or fixed; electronic, magnetic, optical, chemical, mechanical, or otherwise. Example processor-accessible memories include but are not limited to: registers, floppy disks, hard disks, solid-state drives (SSDs), tapes, bar codes, Compact Discs, DVDs, read-only memories (ROM), erasable programmable read-only memories (EPROM, EEPROM, or Flash), and random-access memories (RAMs). One of the processor-accessible memories in the data storage system 210 can be a tangible non-transitory computer-readable storage medium, i.e., a non-transitory device or article of manufacture that participates in storing instructions that can be provided to processor 204 for execution. In some examples, one of the processor-accessible memories in the data storage system 210 can be a non-volatile memory in a Subscriber Identity Module (SIM) card.

In an example, data storage system 210 includes level-1 memory 220, e.g., a random-access memory (RAM), and level-2 memory 222, e.g., a tangible computer-readable medium (CRM), such as a hard drive or other rotational storage device, or a Flash drive or other nonvolatile storage device. Memories 220, 222 can be examples of computer-readable media, e.g., tangible, non-transitory computer-readable media. Computer program instructions are read into level-1 memory 220 from level-2 memory 222. Processor 204 then executes one or more sequences of the computer program instructions loaded into level-1 memory 220, as a result performing process steps described herein. In this way, processor 204 carries out a computer implemented process. For example, steps of methods described herein, blocks of the flowchart illustrations or block diagrams herein, and combinations of those, can be implemented by computer program instructions. Level-1 memory 220 can also store data, or can store only code. In some examples, e.g., using high-speed nonvolatile memory, level-2 memory 222 also functions as level-1 memory 220, and a separate level-1 memory 220 is not used.

In the illustrated example, data storage system 210 includes a datastore 224. Datastore 224 can be, include, or be embodied in a dedicated memory, or a portion of another memory (e.g., level-2 memory 222). Datastore 224 can include, e.g., an SQL, NoSQL, flat-file, or other database; an associative array; or another data-storage subsystem or structure configured for storing information described herein. Such information can include information of criteria or state information used in applying criteria. Examples are discussed herein, e.g., with reference to operations 502, 910, 1302, 1402, and 1416.

In various aspects, system 202 can communicate, e.g., via network 212, with one or more additional computing system (s) 226. System 226 can include the same types of components as system 202 but is not required to be identical thereto. Systems 202 and 226 can be communicatively connected via the network 212. Each of systems 202 and 226 can execute computer program instructions to perform operations described herein. For example, system 202 can represent a relay node and system 226 can represent an authentication node, or systems 202, 226 can represent respective, different authentication nodes. Each system 202, 226 can execute computer program instructions to conduct at least a portion of at least one exchange described herein with reference to FIGS. 3-14. In some examples, systems 202 and 226 can be collocated, e.g., UDM 126 with S-CSCF 124.

In the illustrated example, any systems 202, 226 can be implemented using computing node(s) in a cluster computing system, e.g., a cloud service or other cluster system ("computing cluster" or "cluster") having several discrete computing nodes that work together to accomplish a computing task assigned to the cluster as a whole. In some examples, at least one of systems 202, 226 can be a client of a cluster and can submit jobs to the cluster and/or receive job results from the cluster. Nodes in the cluster can, e.g., share resources, balance load, increase performance, and/or provide fail-over support and/or redundancy. Additionally, or alternatively, at least one of systems 202, 226 can communicate with the cluster, e.g., with a load-balancing or job-coordination device of the cluster, and the cluster or components thereof can route transmissions to individual nodes.

Some cluster-based systems can have all or a portion of the cluster deployed in the cloud. Cloud computing allows for computing resources to be provided as services rather than a deliverable product. For example, in a cloud-computing environment, resources such as computing power, software, information, and/or network connectivity are provided (for example, through a rental agreement) over a network, such as the Internet. As used herein, the term "computing" used with reference to computing clusters, nodes, and jobs refers generally to computation, data manipulation, and/or other programmatically-controlled operations. The term "resource" used with reference to clusters, nodes, and jobs refers generally to any commodity and/or service provided by the cluster for use by jobs. Resources can include processor cycles, disk space, RAM space, network bandwidth (uplink, downlink, or both), prioritized network channels such as those used for communications with quality-of-service (QoS) guarantees, backup tape space and/or mounting/unmounting services, electrical power, etc.

Furthermore, various aspects herein may be embodied as computer program products including computer readable program code ("program code") stored on a computer readable medium, e.g., a tangible non-transitory computer storage medium or a communication medium. A computer storage medium can include tangible storage units such as volatile memory, nonvolatile memory, or other persistent or auxiliary computer storage media, removable and non-removable computer storage media implemented in any method or technology for storage of information such as computer-readable instructions, data structures, program modules, or other data. A computer storage medium can be manufactured as is conventional for such articles, e.g., by pressing a CD-ROM or electronically writing data into a Flash memory. In contrast to computer storage media, communication media may embody computer-readable instructions, data structures, program modules, or other data in a modulated data signal, such as a carrier wave or other transmission mechanism. As defined herein, computer storage media do not include communication media. That is, computer storage media do not include communications media consisting solely of a modulated data signal, a carrier wave, or a propagated signal, per se.

The program code includes computer program instructions that can be loaded into processor 204 (and possibly also other processors), and that, when loaded into processor 204, cause functions, acts, or operational steps of various aspects herein to be performed by processor 204 (or other processor). Computer program code for carrying out operations for various aspects described herein may be written in any combination of one or more programming language(s), and can be loaded from level-2 memory 222 into level-1 memory 220 for execution. The program code may execute, e.g., entirely on processor 204, partly on processor 204 and partly on a remote computer connected to network 212, or entirely on the remote computer.

In some examples, a "control unit" as described herein includes processor 204. A control unit can also include, if required, data storage system 210 or portions thereof. For example, a control unit can include a CPU or DSP (processor 204), and can include a computer storage medium or other tangible, non-transitory computer-readable medium storing instructions executable by that CPU or DSP to cause that CPU or DSP to perform functions described herein. Additionally, or alternatively, a control unit can include an ASIC, FPGA, or other logic device(s) wired (e.g., physically or via blown fuses or logic-cell configuration data) to perform functions described herein. In some example of control units including ASICs or other devices physically configured to perform operations described herein, a control unit does not include computer-readable media (e.g., level-2 memory 222) storing processor-executable instructions.

Figure 3:
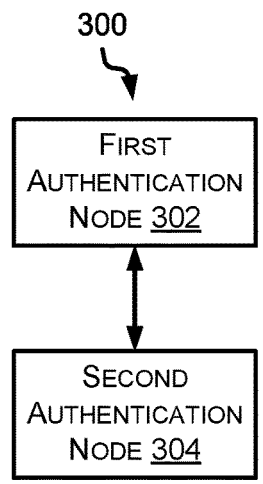
FIG. 3 shows an example system associated with a telecommunications network.

FIG. 3 shows an example system 300 associated with a telecommunications network. A first authentication node 302 of the telecommunications network is associated with one of an access network 104 and an application network 106. Node 302 is configured to authenticate a terminal. Second authentication node 304 can be associated with the other of the access network and the application network and configured to authenticate the terminal. Node 304 can be different from node 302. Nodes 302, 304 can communicate load information or authentication commands. For example, a CSCF configured to communicate via a Service-Based Architecture (SBA) can communicate with an AMF via SBA rather than via relay node 402.

In some examples, node 302 associated with access network 104 can include an AMF 118 or MME. In other examples, node 302 associated with application network 106 can include a CSCF (e.g., I-CSCF 122 or S-CSCF 124).

In some examples, node 304 associated with application network 106 can include a CSCF (e.g., I-CSCF 122 or S-CSCF 124). In other examples, node 304 associated with access network 104 can include an AMF 118 or MME.

In some examples, e.g., of 5G networks, the first authentication node 302 comprises an AMF 118 and the second authentication node 304 comprises a CSCF. In some examples, e.g., of 5G networks, the first authentication node 302 comprises a CSCF and the second authentication node 304 comprises an AMF 118. In some examples, e.g., of 4G networks, the first authentication node 302 comprises an MME and the second authentication node 304 comprises a CSCF. In some examples, e.g., of 4G networks, the first authentication node 302 comprises a CSCF and the second authentication node 304 comprises an MME.

Figure 4:
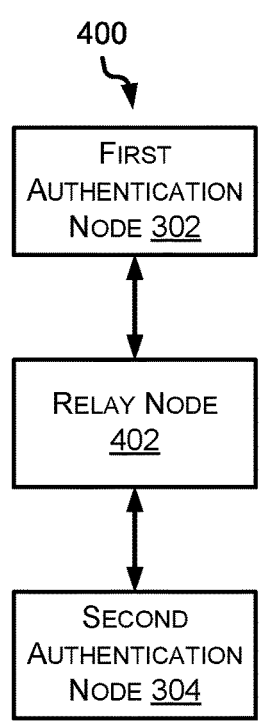
FIG. 4 shows an example system associated with a telecommunications network and including a relay node.

FIG. 4 shows an example system 400 associated with a telecommunications network. System 400 includes first authentication node 302 and second authentication node 304. A relay node 402 of the telecommunications network is communicatively connected with the first authentication node 302. Relay node 402 can send messages to the second authentication node 304. For example, access network 104 and application network 106 (e.g., an IMS core) can communicate load state or actions that are required by the load state via relay node 402.

In some examples, a network path between nodes 302 and 304 can include additional relay nodes, omitted for brevity. For example, first authentication node 302 can send messages to an NRF 132, e.g., via 5G SBA messages. NRF 132 can forward the messages to relay node 402, e.g., a UDM 126. Relay node 402 can forward the messages to second authentication node 304.

Relay node 402 can include, e.g., an HSS 128 or UDM 126. In some examples, UDM 126 can include an HSS 128 or other Diameter subsystem configured to exchange Cx-interface (or 5G NuCx-interface, and likewise throughout this document) messages with a second authentication node 304 of the telecommunications network. Additionally, or alternatively, relay node 402 can include an NRF 132. A NuCx interface can be implemented, e.g., using HTTPS+JSON (e.g., SBA), Diameter (as in Cx), Diameter-over-HTTPS, or other protocols.

In some examples, relay node 402 can include multiple subsystems (e.g., HSS, UDM, or UDR subsystems), or otherwise be configured to communicate with multiple devices, using a common protocol or using different protocols. Using a UDM 126 having an HSS 128 subsystem (or an HSS 128 having a UDM subsystem) can permit conveying authentication-related messages (e.g., messages 512, 604, or 608, or indication 704) between access network 104 and application network 106 without requiring a dedicated relay. However, this is not required, and some examples include a dedicated relay node 402 connecting nodes 302 and 304, or relay messages between nodes 302 and 304 using a router or other relay that additionally relays other traffic.

In some examples, relay node 402 can include a load-balancing subsystem or otherwise perform load-balancing operations. For example, an NRF, Service Communication Proxy (SCP), SBA bus, or Service Proxy Function (SPF) can route messages between SBA-connected devices, with or without performing load balancing. In some examples, an SCP or SPF can serve as an HTTPS proxy.

In some examples, e.g., of 5G networks, the relay node 402 comprises a UDM 126; the first authentication node 302 comprises an AMF 118; and the second authentication node 304 comprises a CSCF. In some examples, e.g., of 5G networks, the relay node 402 comprises a UDM 126; the first authentication node 302 comprises a CSCF; and the second authentication node 304 comprises an AMF 118. In some examples, e.g., of 4G networks, the relay node 402 comprises an HSS 128; the first authentication node 302 comprises an MME; and the second authentication node 304 comprises a CSCF. In some examples, e.g., of 4G networks, the relay node 402 comprises an HSS 128; the first authentication node 302 comprises a CSCF; and the second authentication node 304 comprises an MME.

Illustrative Operations

Figure 5:
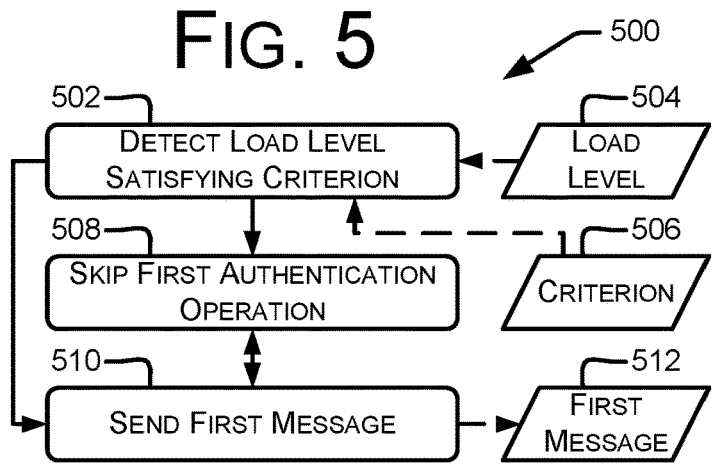
FIG. 5 is a dataflow diagram illustrating an example technique (e.g., at a first authentication node) for controlling authentication requests, and related data items, according to various examples.

FIG. 5 is a dataflow diagram illustrating an example technique 500 for controlling authentication requests, and related data items. For clarity, dataflow is shown dashed throughout FIGS. 5-14. Technique 500 can be performed, e.g., by first authentication node 302. First authentication node 302 can include network interface 216 and datastore 224, e.g., held in level-2 memory 222 or other component of data-storage system 210. First authentication node 302 can include at least one processor 204 and at least one level-1 memory 220, or another control unit, configured to perform operations of technique 500, e.g., in response to computer program instructions.

Operations shown in FIG. 5 and in FIGS. 6-14, discussed below, can be performed in any order except when otherwise specified, or when data from an earlier step is used in a later step. For clarity of explanation, reference is herein made to various components shown in FIGS. 1-4 that can carry out or participate in the steps of the example methods. It should be noted, however, that other components can be used; that is, example method(s) shown in FIGS. 5-14 are not limited to being carried out by the identified components, and are not limited to including the identified operations or messages.

Some operations herein are mutually independent, i.e., neither requires as input and output of the other. Operations described herein as "mutually independent" (e.g., within a group of operations such as those of a method) can be performed in either order, in parallel, at least partly overlapping in time, or partly or wholly as a combined operation, in various examples. A later-run operation of two mutually independent operations may accept input(s) from the earlier-run of the two mutually independent operations, but is not required to wait for those input(s) or for completion of the earlier-run operation before executing.

At 502, the control unit can detect that a load level 504 of the first authentication node 302 satisfies a predetermined criterion 506. In response, the control unit can perform operations 508 and 510 (which are mutually independent).

Throughout this document, any determination that a particular data item "satisfies" a query or criterion is equivalent to a determination that that data item fails to satisfy an inverse query or criterion. For example, a determination that load level 504 satisfies a criterion 506 of "load>X %" is equivalent to a determination that load level 504 fails to satisfy a criterion 506 of "load≤X %". Accordingly, discussion of queries and criteria throughout specifically contemplates the use of inverted queries or criteria with inverted senses of what satisfies a query or criterion.

At 508, the control unit can skip a first authentication operation at the first authentication node 302. Operation 508 can include skipping more than one authentication operation, e.g., all authentication operations. Skipping the first authentication operation with respect to a terminal 102 will cause terminal 102 not to be required to send or receive corresponding network traffic. This can reduce network load.

In some examples, a terminal 102 desiring network services from an IMS or other application network 106 sends a SIP REGISTER request to the application network 106, e.g., to a CSCF such as P-CSCF 120 or S-CSCF 124. Performing an authentication operation can include responding to the REGISTER request with a challenge carried in a SIP 401 Unauthorized response, and then receiving a response in a second REGISTER request. Skipping the authentication operation can include responding to the initial SIP REGISTER request with a SIP 200 OK response.

In some examples, the first authentication operation comprises at least one of: sending a challenge to the terminal; receiving a challenge response from the terminal; or validating the challenge response. The first authentication operation can be an operation defined, e.g., by a 3GPP or non-3GPP AKA procedure, such as LTE AKA (33.401), 5G EAP-AKA' (33.501), 5G AKA (33.501), or other access-stratum, Non-Access Stratum (NAS), Radio Resource Control (RRC), or user-plane (UP) security mechanisms.

In some examples, the challenge can include an Authentication Request from an MME; an NAS Security Mode Command; or another message to which terminal 102 is required to respond in order to receive network service. The challenge response can include an Authentication Response to the MME, an NAS Security Mode Complete message; or another message from terminal 102 having contents determined based at least in part on a challenge. Validating the challenge response can include, e.g., computing a cryptographic hash over at least a portion of the challenge response (and, in some examples, over shared secret(s)); comparing hashes; comparing data in the challenge response with a reference; validating a cryptographic signature; or otherwise determining that the challenge response corresponds with the challenge. In some examples, challenge(s) and challenge response(s) are designed so that validation will fail unless terminal 102 and first authentication node 302 have access to a shared secret.

At 510, the control unit can send a first message 512, e.g., to second authentication node 304 or relay node 402. First message 512 can include, e.g., a notification that first authentication node 302 is no longer performing the first authentication operation, is no longer able to perform authentication operations with respect to at least some authentication requests, or is no longer performing authentication. Additionally, or alternatively, first message 512 can include data indicating load level 504 of the first authentication node 302. Operation 510 can include issuing an API request, e.g., using HTTPS (e.g., to a REST endpoint), Diameter (Cx), or other protocols. Sending first message 512 can permit coordinating authentication operations so that terminal 102 is required to authenticate to at least one subsystem, in some examples.

Figure 6:
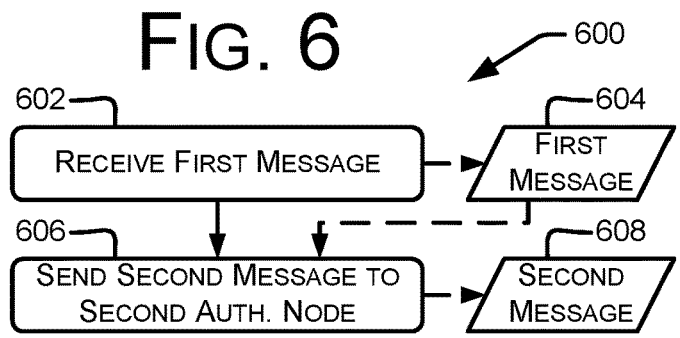
FIG. 6 is a dataflow diagram illustrating an example technique (e.g., at a relay node) for processing authentication-related notifications, and related data items, according to various examples.

FIG. 6 is a dataflow diagram illustrating an example technique 600 for processing authentication-related notifications, and related dataflow. In some examples, technique 600 can be performed by a control unit, as described herein, e.g., of a relay node 402. In some examples, operation 602 is performed subsequent to operation 510.

At 602, the control unit can receive a first message 604 (which can represent first message 512). Operation 602 can include receiving first message 604, e.g., via a Cx or HTTPS (e.g., SBA) connection.

At 606, the control unit can send a second message 608 to the second authentication node 304. Second message 608 can include an indication (e.g., copy or modified version) of first message 604. Operation 606 can be performed in response to the determination at operation 602.

Operation 606 can include determining second message 608 based at least in part on first message 604 or in response to message 604, in various examples. Operation 606 can include sending second message 608, e.g., via an HTTPS or Cx connection (e.g., the opposite of that used in operation 602). For example, second message 608 can include an instruction to second authentication node 304 to set a flag or otherwise store data indicating that terminal(s) 102 should be authenticated by the second authentication node 304.

In some examples, relay node 402 stores information related to first message 604 or second message 608. For example, relay node 402 can store data in datastore 224 indicating "no access-network authentication" or "no application-network authentication."

Figure 7:
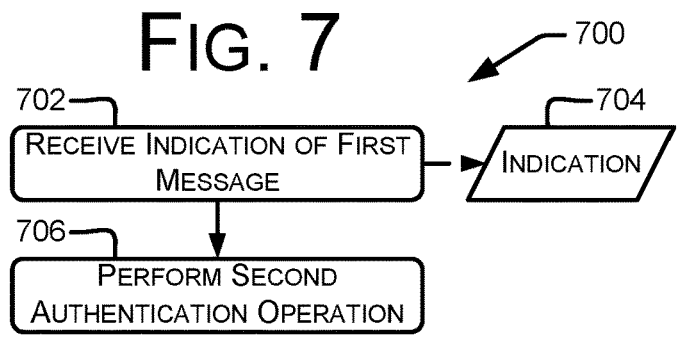
FIG. 7 is a dataflow diagram illustrating an example technique (e.g., at a second authentication node) for processing authentication-related notifications, and related data items, according to various examples.

FIG. 7 is a dataflow diagram illustrating an example technique 700 for processing authentication-related notifications, and related dataflow. In some examples, technique 700 can be performed by a control unit, as described herein, e.g., of a second authentication node 304. In some examples, operation 702 is performed subsequent to operation 510 or operation 606.

At 702, the control unit can receive an indication 704 (which can represent first message 512 or second message 608) of a first message, e.g., first message 512 or 604. Operation 702 can include receiving indication 704, e.g., via an HTTPS or Cx connection. In some examples of system 300, indication 704 can be a copy of first message 512. In some examples of system 400, indication 704 can be a copy of second message 608.

At 706, the control unit can perform a second authentication operation at the second authentication node. Operation 706 can be performed in response to receipt at operation 702 of indication 704. Operation 706 can include performing one, more than one, or all of a set of authentication operations.

Performing authentication operation(s) at node 304 in response to or subsequent to skipping of authentication operation(s) at node 302 can reduce traffic volume or network load while still maintaining security. For example, when a first authentication operation is skipped at operation 508 with respect to a particular terminal 102, a second authentication operation can be performed at operation 706 with respect to that terminal 102. This can permit reducing the amount of authentication traffic with respect to that terminal 102 while still controlling the ability of terminals 102 to access network services.

In some examples, system 300 implements techniques 500, 600, and 700. In some of these examples, a CSCF or other first authentication node 302 of an application network 106 experiences an overload or other undesirable operational condition. Node 302 sends a REST request or other message 512 towards a UDM 126 or another relay node 402 to indicate that node 302 is bypassing initial authorization, subsequent authorization, or both, and thus that authentication should be performed at the access network 104. Similarly, in some examples, AMF 118 or another node 302 of access network 104 sends message 512 towards relay node 402 to indicate that authentication should be performed at the application network 106.

In some examples, the first authentication node 302 is configured to skip the first authentication operation with respect to a first request from a first terminal, and perform the first authentication operation with respect to a second request from a second terminal. For example, the first authentication node 302 can authenticate a predetermined percentage of terminals or requests. The second authentication node 304 can be configured to perform the second authentication operation with respect to a third request from the first terminal. For example, if a terminal was not authenticated by the first authentication node 302, that terminal can be authenticated by the second authentication node 304.

FIG. 8 is a dataflow diagram illustrating an example technique 800 for responding to conditions at a relay node, and related dataflow. In some examples, technique 800 can be performed by a control unit, as described herein, e.g., of a relay node 402, such as an NRF 132 or UDM 126. Various examples include performing operations of technique 800 by relay node 402. For example, a UDM 126 can trigger authorization bypass towards a CSCF or AMF 118 (or other node in the access or application network) in response to an overload or service interruption.

At 802, the control unit can detect a condition 804 of the relay node, e.g., an overload or service-interruption condition. Examples are discussed herein, e.g., with reference to operation 502. Operation 802 can include determining a loadavg, load percentage, moving-average bandwidth utilization, processor 204 usage, number of processor 204 cores in use, or other value(s), and comparing the value(s) to stored threshold(s). Operation 802 can include detecting condition 804 as present if the value(s) exceed the threshold(s).

In some examples, condition 804 is affected by authentication operations performed by authentication nodes 302 and 304. For example, a first authentication operation, such as a challenge/response exchange with access network 104, may require the first authentication node 302 to query UDM 126 or HSS 128 for authentication vectors, challenge data, credentials, data indicating whether a user or terminal is authorized to access a requested service, or other authentication-related data. Similarly, a second authentication operation, such as a challenge/response exchange with application network 106, may require the second authentication node 304 to query UDM 126 or HSS 128 for similar authentication-related data. Accordingly, the load or other condition 804 of relay node 402, or of network links connected with relay node 402, can be affected by controlling authentication operations at authentication nodes 302 or 304. Similarly, condition 804 of a UDM 126 or HSS 128 is affected by the amount of traffic from authentication nodes 302 or 304, even if the UDM 126 or HSS 128 is not relaying messages.

At 806, the control unit can determine a first authentication-control message 808 (which can represent first message 512, second message 608, or indication 704). Examples are discussed herein, e.g., with reference to operations 510 and 606. For example, first authentication-control message 808 can include data indicating that challenge-response exchanges should not be carried out, or should be carried out for fewer than all requests for network service. Operation 806 can be performed, e.g., in response to the detection at operation 802 of condition 804.

At 810, the control unit can send the first authentication-control message 808 to a first authentication node associated with at least an access network or an application network to cause the authentication node to skip at least one authentication operation. Examples are discussed herein, e.g., with reference to operations 510 and 606. For example, the control unit can send the first authentication-control message 808 via an SBA- or Cx-interface message.

FIG. 9 is a dataflow diagram that illustrates example techniques 900 for selecting an authentication node, and related dataflow. In some examples, techniques 900 can be performed by a control unit, as described herein, e.g., of a relay node 402. In some examples, operations 902-910 are performed before operation 802 (detecting a condition) or operation 806 (determining an authentication-control message).

At 902, the control unit can receive a first plurality 904 of first requests from the first authentication node 302. For example, the first requests can include Diameter or SBA requests for authentication vectors, authorization information, or other data described herein with reference to operation 802.

At 906, the control unit can receive a second plurality 908 of second requests from a second authentication node 304 that is different from the first authentication node 302. Examples are discussed herein, e.g., with reference to operation 902. Operations 902 and 906 can be mutually independent. For example, first requests of the first plurality 904 can be received time-interleaved or currently with second requests of the second plurality 908. In some examples, first requests are received via SBA and second requests via Diameter, or vice versa.

At 910, the control unit can select the first authentication node 302 based at least in part on the first plurality 904 being associated with a higher load of the relay node 402, for example, more requests per second, higher CPU usage, or more cores in use, than the second plurality 908. Operation 910 can be followed by operation 806 of determining the first authentication-control message further in response to the selecting at operation 910.

As discussed herein with reference to operation 802, authentication operations at nodes 302 or 304 can affect the load on relay node 402. Operation 910 can include selecting the node 302, 304 whose activity (plurality 904, 908, respectively) is causing higher load at relay node 402. Load can be measured, e.g., in requests per second, processor 204 usage, number of processor 204 cores devoted to requests from a particular plurality 904, 908, or other values described herein with reference to operation 802. Selecting the node 302, 304 triggering higher load at relay node 402 can provide rapid, significant load reduction at relay node 402, in some examples. In other examples, the lower-load node 302, 304 is selected. As noted above, techniques herein can be used with more than two authentication nodes 302, 304.

FIG. 10 is a dataflow diagram that illustrates example techniques 1000 for coordinating authentication across multiple nodes, and related dataflow. In some examples, techniques 1000 can be performed by a control unit, as described herein, e.g., of a relay node 402. In some examples, operation 1002 is preceded by operation 802 or operation 904. Operations 1002 and 1006 can be mutually independent of operations 806 and 810.

In some examples, the first authentication node 302, to which the first authentication-control message 808 is sent at operation 810, can be associated with a first network of the access network 104 and the application network 106.

At 1002, the control unit can determine a second authentication-control message 1004 (which can represent first message 512, second message 608, indication 704, or first authentication-control message 808). Operation 1002 can be performed at least partly in response to the detecting the overload or service-interruption condition 804 of the relay node 402, although that is not required.

At 1006, the control unit can send the second authentication-control message 1004 to the second authentication node 304. The second authentication node 304 can be associated with a second network of the access network 104 and the application network 106. The second network can be different from the first network with which the first authentication-control node 302 is associated. Accordingly, in some examples, each authentication node 302, 304 can respond to the respective authentication-control message 808, 1004 by skipping or disabling at least some authentication operation(s).

In some examples, terminal(s) 102 send requests for service to networks 104, 106. A request for service can be or include a request to authenticate to the network to which the request is sent. In some examples, the first authentication-control message 808 specifies a percentage of first requests for service with respect to which the first authentication operation should be performed (e.g., by first authentication node 302). Additionally, or alternatively, the second authentication-control message 1004 can specify a percentage of the second requests (plurality 908) with respect to which the second authentication operation should be performed (e.g., by second authentication node 304). For example, authentication can be performed using spot checks, instead of authenticating every request, to reduce network-resource demand. In some examples, the percentage can be 10%, 5%, 1%, or a different value.

In some examples, operation 806 comprises determining the first authentication-control message 808 directing the first authentication node 302 to skip a first authentication operation with respect to at least seventy-five percent of (e.g., ninety percent, ninety-five percent, or one hundred percent of) first requests for service received by the first authentication node. For example, the percentage referred to in the preceding paragraph can be <25%. In some of these examples, operation 1002 comprises determining the second authentication-control message 1004 directing the second authentication node 304 to perform a second authentication operation with respect to at least seventy-five percent of second requests for service received by the second authentication node.

In some examples, in response to authentication-control messages 808 and 1004, first authentication node 302 can disable the first authentication operation (e.g., perform the first authentication operation for none, or substantially none, of the first requests). Second authentication node 304 can enable the second authentication operation for all, or substantially all, of the second requests. This can entirely or substantially remove load on the relay node triggered by first requests, while still maintaining security using the second authentication operation used with respect to the second requests.

In some examples, first authentication-control message 808 does not specify a specific percentage. In some of these examples, the authentication node 302, 304 receiving the first authentication-control message 808 can select a percentage, e.g., by retrieving a percentage from a configuration datastore or by selecting a random percentage within a stored range.

In various examples, operation 806 comprises determining the first authentication-control message 808 directing the first authentication node 302 to perform a first authentication operation with respect to fewer than all first requests for service from network terminal(s) 102. Operation 1002 comprises determining the second authentication-control message 1004 directing the second authentication node 304 to perform a second authentication operation with respect to fewer than all second requests for service from network terminal(s) 102. Examples are discussed above.

FIG. 11 is a dataflow diagram that illustrates an example technique 1100 for processing an authentication request from a terminal based on an authentication-control message, and related dataflow. Technique 1100 can be performed by a control unit, e.g., of an authentication node 302, 304 (e.g., an AMF 118, MME, or CSCF). Some examples include at least one tangible, non-transitory computer-readable medium comprising instructions that, when executed by at least one processor 204, cause the at least one processor 204 to perform operations of technique 1100.

At 1102, the control unit can receive, via a communications interface from a network node (e.g., relay node 402), an authentication-control message 1104 (which can represent first message 512, second message 608, indication 704, or authentication-control message 808 or 1004). Examples are discussed herein, e.g., with reference to operation 702. In some examples, operations 1102 and 1106 are mutually independent.

At 1106, the control unit can receive an authentication request 1108 from a terminal 102. Authentication request 1108 can include, e.g., a Security Mode Command, SIP REGISTER, or other request to authenticate to a network associated with the control unit. Examples are discussed herein, e.g., with reference to FIG. 1 and operation 508.

At 1110, the control unit can skip, at least partly in response to the authentication-control message 1104, an authentication operation with respect to the authentication request 1108. Examples are discussed herein, e.g., with reference to operation 508. In some examples, both operation 1102 and operation 1106 are performed before operation 1110.

For example, the instructions on the at least one tangible, non-transitory computer-readable medium can include a conditional instruction ("if" statement) to test whether the authentication request 1108 satisfies a predefined criterion, or a criterion stored in or associated with (e.g., indicated or linked to by) authentication-control message 1104. The instructions can also include a branch instruction ("jump") to, in response to a predetermined output of the test, bypass execution of instructions that would have, if executed, performed the authentication operation with respect to the authentication request 1108. The conditional and branch instructions can be combined, e.g., in an ARM Thumb-2 "cbz" (compare to zero and branch if equal) instruction.

In some examples, operation 1110 can be performed with respect to all incoming authentication requests 1108, e.g., by recording data indicating that the authentication operation is disabled. Additionally, or alternatively, operation 1110 can be performed individually with respect to multiple authentication requests 1108. The authentication requests 1108 with respect to which an authentication operation is skipped (operation 1110 is performed) can be selected be randomly or deterministically. Examples are discussed herein, e.g., with reference to FIG. 14.

FIG. 12 is a dataflow diagram that illustrates example techniques 1200 for controlling authentication and processing authentication requests, and related dataflow. In some examples, techniques 1200 can be performed by a control unit, as described herein, e.g., of an authentication node 302, 304. In some examples, operation 1202 is performed after operation 1102; operation 1202 is performed after operation 1106; or operation 1110 includes operation 1202.

At 1202, the control unit can send an authentication-acceptance message 1204 to the terminal at least partly in response to the authentication-control message 1104. The authentication-acceptance message can include, e.g., a SIP 200 OK response to a SIP REGISTER request. Examples are discussed herein, e.g., with reference to operation 508.

FIG. 13 is a dataflow diagram that illustrates example techniques 1300 for controlling authentication and processing authentication requests, and related dataflow. In some examples, techniques 1300 can be performed by a control unit, as described herein, e.g., of an authentication node 302, 304. In some examples, operations 1302-1310 are performed in parallel with (e.g., are mutually independent of) operations 1102-1110 or operation 1202. In some examples, an authentication node 302, 304 is both responsive to authentication-control message(s) 1104 and configured to originate authentication-control message(s) 1308 in response to its own load or other condition 1304. For example, an AMF 118, MME, or CSCF can both respond to load-related messages from UDM 126 and originate load-related messages to the UDM 126.

At 1302, the control unit can detect an overload or service-interruption condition 1304, e.g., of the authentication node 302, 304. Examples are discussed herein, e.g., with reference to operations 502 and 802.

At 1306, the control unit can determine a second authentication-control message 1308 (which can represent first message 512) requesting authentication be carried out other than by the at least one processor. For example, the second authentication-control message 1308 can carry data indicating that the authentication node 302, 304 including the control unit is unable to perform authentication operations, or unable to perform authentication operations with respect to all authentication requests. Operation 1306 can be performed in response to the determination at operation 1302, in some examples. Examples are discussed herein, e.g., with reference to operation 510.

At 1310, the control unit can send the second authentication-control message 1308 to a network node, e.g., the network node from which authentication-control message 1104 was received. For example, the control unit can send second authentication-control message 1308 to relay node 402. Examples are discussed herein, e.g., with reference to operation 510.

Figure 14:
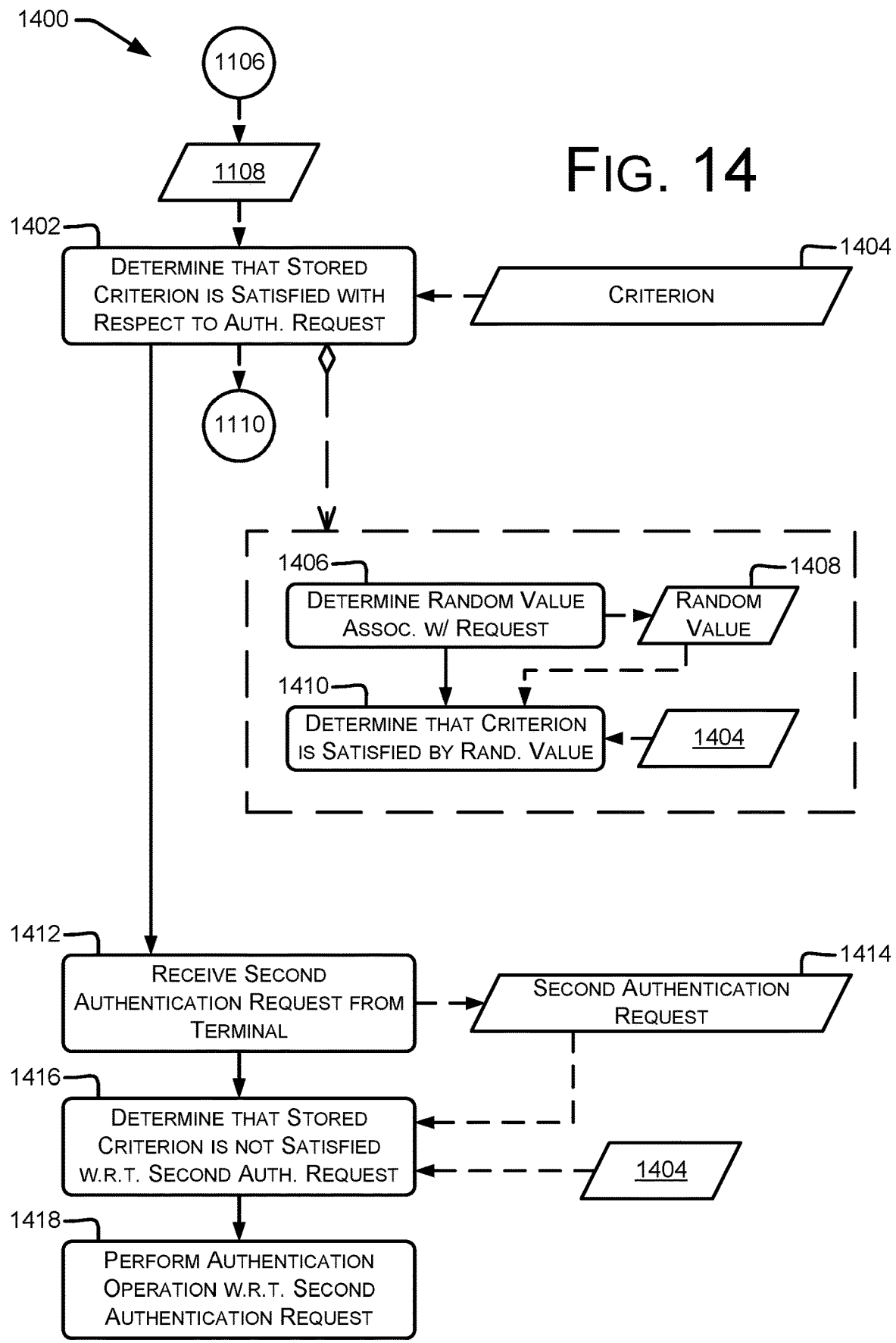
FIG. 14 is a dataflow diagram illustrating example techniques (e.g., at an authentication node) for processing authentication requests, and related data items, according to various examples.

FIG. 14 is a dataflow diagram that illustrates example techniques 1400 for processing authentication requests, and related dataflow. In some examples, techniques 1400 can be performed by a control unit, as described herein, e.g., of an authentication node 302, 304. In some examples, operation 1106 can be followed by operation 1402, or operation 1402 can precede operation 1110.

At 1402, the control unit can determine that a stored criterion 1404 is satisfied with respect to the authentication request 1108. In some examples using operation 1402, operation 1110 of skipping the authentication operation can be performed further in response to the stored criterion being satisfied. In some examples, operation 1402 can use random value(s), and can include operations 1406 and 1410. In some examples, operation 1402 can be followed by operation 1412.

In some examples, operation 1402 can determine that criterion 1404 is satisfied using a computation that does not use random values. For example, criterion 1404 can specify that authentication should be performed with respect to every Nth authentication request 1108, N>1 (e.g., N=5, 10, 20, 50, or 100). The control unit can access a counter, e.g., stored in data storage system 210. The control unit can increment the counter for each authentication request 1108 received, and can reset the counter to zero when the value of the counter reaches N. At operation 1402, the control unit can determine that criterion 1404 is satisfied if the value of the counter is nonzero (or is different from another predetermined value, e.g., 42 in some examples with N>42). In this way, authentication operations will be skipped (operation 1110) for all but the 1-of-Nth authentication request 1108.

Additionally, or alternatively, criterion 1404 can specify round-robin selection of attached terminals 102. At operation 1402, the control unit can determine that criterion 1404 is satisfied if an authentication operation has already been performed with respect to the terminal 102 from which an authentication request 1108 has been received, and stored data indicates that it is not yet the turn of that terminal 102 to repeat the authorization operation. This can permit reducing the network load due to re-authentication requests from known terminals.

At 1406, the control unit can determine a random value 1408 associated with the authentication request. For example, the control unit can read a value from a sensor measuring a physical source of randomness, or can operate a pseudorandom number generator to determine a value. Random value 1408 can be or include a numeric value or a non-numeric value. For example, random value 1408 can be a heads/tails indication, bit, or other two-valued flag. Additionally, or alternatively, random value 1408 can be a fixed-point or floating-point value v, e.g., $0 \le v < 1$. Additionally, or alternatively, random value 1408 can be an integer value v, e.g., $0 \le v < V$ for a predetermined V.

At 1410, the control unit can determine that the stored criterion 1404 is satisfied by the random value 1408. For example, the control unit can test a numeric random value 1408 v against a corresponding range specified in criterion 1404, e.g., as noted in the previous paragraph. Additionally, or alternatively, the control unit can test random value 1408 for equality with a predetermined value stored in criterion 1404, e.g., "1" or "0" for a single-bit random value 1408.

At 1412, the control unit can receive a second authentication request 1414 from a terminal 102. Examples are discussed herein, e.g., with reference to operations 1106.

At 1416, the control unit can determine that the stored criterion 1404 is not satisfied with respect to the second authentication request 1414. Examples are discussed herein, e.g., with reference to operation 1402. For example, a second random value can be selected and tested against criterion 1404, e.g., as discussed herein with reference to operations 1406 and 1410.

At 1418, the control unit can perform the authentication operation with respect to the second authentication request 1414 in response to the stored criterion 1404 not being satisfied. Examples are discussed herein, e.g., with reference to operations 508 and 706. Accordingly, in some examples, operation 1110 is performed if and only if criterion 1404 is satisfied.

Example Clauses

Various examples include one or more of, including any combination of any number of, the following example features. Throughout these clauses, parenthetical remarks are for example and explanation, and are not limiting. Parenthetical remarks given in this Example Clauses section with respect to specific language apply to corresponding language throughout this section, unless otherwise indicated.

Clause 1. At least one tangible, non-transitory computer-readable medium comprising instructions that, when executed by at least one processor, cause the at least one processor to perform operations comprising: receiving, via a communications interface from a network node, an authentication-control message; receiving an authentication request from a terminal; and skipping, at least partly in response to the authentication-control message, an authentication operation with respect to the authentication request.

Clause 2. The at least one tangible, non-transitory computer-readable medium according to clause 1, the operations comprising sending an authentication-acceptance message to the terminal at least partly in response to the authentication-control message.

Clause 3. The at least one tangible, non-transitory computer-readable medium according to clause 1, the operations further comprising: determining that a stored criterion is satisfied with respect to the authentication request; and skipping the authentication operation further in response to the stored criterion being satisfied.

Clause 4. The at least one tangible, non-transitory computer-readable medium according to clause 3, the operations further comprising: determining a random value associated with the authentication request; and determining that the stored criterion is satisfied by the random value.

Clause 5. The at least one tangible, non-transitory computer-readable medium according to clause 3, the operations further comprising: receiving a second authentication request from a terminal; determining that the stored criterion is not satisfied with respect to the second authentication request; and performing the authentication operation with respect to the second authentication request in response to the stored criterion not being satisfied.

Clause 6. The at least one tangible, non-transitory computer-readable medium according to clause 1, the operations further comprising: detecting an overload or service-interruption condition; determining, in response, a second authentication-control message requesting authentication be carried out other than by the at least one processor; and sending the second authentication-control message to the network node.

Clause 7. A system, comprising: a first authentication node of the telecommunications network, the first authentication node associated with one of an access network and an application network and configured to authenticate a terminal; and a second authentication node of the telecommunications network, the second node being different from the first authentication node, the second authentication node associated with the other of the access network and the application network and configured to authenticate the terminal; wherein: the first authentication node is configured to: detect that a load level of the first authentication node satisfies a predetermined criterion; and in response: skip a first authentication operation at the first authentication node; and send a first message; and the second authentication node is configured to: receive an indication of the first message; and perform, in response, a second authentication operation at the second authentication node.

Clause 8. The system according to clause 7, wherein: the system further comprises a relay node of a telecommunications network; the relay node is communicatively connected with both the first authentication node and the second authentication node; and the relay node is configured to: receive the first message; and send, in response, a second message to the second authentication node, the second message comprising the indication of the first message.

Clause 9. The system according to clause 7, wherein: the first authentication node is configured to: skip the first authentication operation with respect to a first request from a first terminal; and perform the first authentication operation with respect to a second request from a second terminal; and the second authentication node is configured to: perform the second authentication operation with respect to a third request from the first terminal.

Clause 10. The system according to clause 7, wherein the first authentication operation comprises at least: sending a challenge to the terminal; receiving a challenge response from the terminal; or validating the challenge response.

Clause 11. The system according to clause 7, wherein: the relay node comprises a UDM; the first authentication node comprises an AMF; and the second authentication node comprises a CSCF.

Clause 12. The system according to clause 7, wherein: the relay node comprises an HSS; the first authentication node comprises an MME; and the second authentication node comprises a CSCF.

Clause 13. The system according to clause 7, wherein: the relay node comprises a UDM; the first authentication node comprises a CSCF; and the second authentication node comprises an AMF.

Clause 14. The system according to clause 7, wherein: the relay node comprises an HSS; the first authentication node comprises a CSCF; and the second authentication node comprises an MME.

Clause 15. A method comprising, by a relay node of a telecommunications network: detecting an overload or service-interruption condition of the relay node; determining, in response, a first authentication-control message; and sending the first authentication-control message to a first authentication node associated with at least an access network or an application network to cause the authentication node to skip at least one authentication operation.

Clause 16. The method according to clause 15, further comprising, by the relay node: determining a second authentication-control message; sending the first authentication-control message to the first authentication node associated with a first network of the access network and the application network; and sending the second authentication-control message to a second authentication node associated with a second network of the access network and the application network, the second network different from the first network.

Clause 17. The method according to clause 16, further comprising, by the relay node: determining the first authentication-control message directing the first authentication node to skip a first authentication operation with respect to at least seventy-five percent of first requests for service received by the first authentication node; and determining the second authentication-control message directing the second authentication node to perform a second authentication operation with respect to at least seventy-five percent of second requests for service received by the second authentication node.

Clause 18. The method according to clause 16, further comprising, by the relay node: determining the first authentication-control message directing the first authentication node to perform a first authentication operation with respect to fewer than all first requests for service from network terminal(s); and determining the second authentication-control message directing the second authentication node to perform a second authentication operation with respect to fewer than all second requests for service from network terminal(s).

Clause 19. The method according to clause 18, wherein at least: the first authentication-control message specifies a percentage of the first requests for service with respect to which the first authentication operation should be performed; or the second authentication-control message specifies a percentage of the second requests for service with respect to which the second authentication operation should be performed.

Clause 20. The method according to clause 15, further comprising, by the relay node: before detecting the condition: receiving a first plurality of first requests from the first authentication node; and receiving a second plurality of second requests from a second authentication node that is different from the first authentication node; selecting the first authentication node based at least in part on the first plurality being associated with a higher load of the relay node than the second plurality; and determining the first authentication-control message further in response to the selecting.

Clause 21: The system according to any of clauses 7-9, edited to remove "detect a load level of the first authentication node satisfying a predetermined criterion; and in response:"

Clause 22: The method according to any of clauses 15-20, edited to replace "detecting an overload or service-interruption condition of the relay node; determining, in response" with "determining" and to remove "before detecting the overload condition:".

Clause 23: The method according to clause 16, further comprising determining the second authentication-control message at least partly in response to the detecting the overload or service-interruption condition of the relay node.

Clause 24: The method according to clause 17, wherein the at least seventy-five percent is ninety percent, ninety-five percent, or one hundred percent.

Clause 25: At least one feature from each of at least two of: a method, a non-transitory computer-readable medium, or a system.

Clause 26: A computer-readable medium, e.g., a computer storage medium, having thereon computer-executable instructions, the computer-executable instructions upon execution configuring a computer to perform operations as any of clauses 15-20 recites.

Clause 27: A device comprising: a processor; and a computer-readable medium, e.g., a computer storage medium, having thereon computer-executable instructions, the computer-executable instructions upon execution by the processor configuring the device to perform operations as any of clauses 15-20 recites.

Clause 28: A system comprising: means for processing; and means for storing having thereon computer-executable instructions, the computer-executable instructions including means to configure the system to carry out a method as any of clauses 15-20 recites.

Clause 29: A method comprising performing operations as any of clauses 15-20 recites.

Conclusion

This disclosure is inclusive of combinations of the aspects described herein. References to "a particular aspect" (or "embodiment" or "version") and the like refer to features that are present in at least one aspect. Separate references to "an aspect" (or "embodiment") or "particular aspects" or the like do not necessarily refer to the same aspect or aspects; however, such aspects are not mutually exclusive, unless so indicated or as are readily apparent to one of skill in the art.

The use of singular or plural in referring to "method" or "methods" and the like is not limiting.

Although some features and examples herein have been described in language specific to structural features or methodological steps, it is to be understood that the subject matter herein is not necessarily limited to the specific features or steps described. For example, the operations of example techniques herein are illustrated in individual blocks and logical flows thereof, and are summarized with reference to those blocks. The order in which the operations are described is not intended to be construed as a limitation unless otherwise indicated, and any number of the described operations can be executed in any order, combined in any order, subdivided into multiple sub-operations, or executed in parallel to implement the described techniques. For example, in alternative implementations included within the scope of the examples described herein, elements or functions can be deleted, or executed out of order from that shown or discussed, including substantially synchronously or in reverse order.

Each illustrated block can represent one or more operations that can be implemented in hardware, software, or a combination thereof. In the context of software, the operations described herein represent computer-executable instructions stored on at least one computer-readable medium that, when executed by one or more processors, enable the one or more processors to perform the recited operations. Accordingly, the methods and techniques described above can be embodied in, and fully automated via, software code modules executed by one or more computers or processors. Generally, computer-executable instructions include routines, programs, objects, modules, code segments, components, data structures, and the like that perform particular functions or implement particular abstract data types. Some or all of the methods can additionally or alternatively be embodied in specialized computer hardware. For example, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system." The described techniques can be performed by resources associated with one or more computing systems 202, 226 or processors 204, such as one or more internal or external CPUs or GPUs, or one or more pieces of hardware logic such as FPGAs, DSPs, or other types of accelerators.

Conditional language such as, among others, "can," "could," "might" or "may," unless specifically stated otherwise, are understood within the context to present that certain examples include, while other examples do not include, certain features, elements or steps. Thus, such conditional language is not generally intended to imply that certain features, elements or steps are in any way required for one or more examples or that one or more examples necessarily include logic for deciding, with or without user input or prompting, whether certain features, elements or steps are included or are to be performed in any particular example.

The word "or" and the phrase "and/or" are used herein in an inclusive sense unless specifically stated otherwise. Accordingly, conjunctive language such as, but not limited to, at least one of the phrases "X, Y, or Z," "at least X, Y, or Z," "at least one of X, Y or Z," and/or any of those phrases with "and/or" substituted for "or," unless specifically stated otherwise, is to be understood as signifying that an item, term, etc., can be either X, Y, or Z, or a combination of any elements thereof (e.g., a combination of XY, XZ, YZ, and/or XYZ). Any use herein of phrases such as "X, or Y, or both" or "X, or Y, or combinations thereof" is for clarity of explanation and does not imply that language such as "X or Y" excludes the possibility of both X and Y, unless such exclusion is expressly stated. As used herein, language such as "one or more Xs" shall be considered synonymous with "at least one X" unless otherwise expressly specified. Any recitation of "one or more Xs" signifies that the described steps, operations, structures, or other features may, e.g., include, or be performed with respect to, exactly one X, or a plurality of Xs, in various examples, and that the described subject matter operates regardless of the number of Xs present.

It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim clause is a reference to at least some of the items in the group of items, unless specifically stated otherwise. This document expressly envisions alternatives with respect to each and every one of the following claims individually, in any of which claims any such reference refers to each and every one of the items in the corresponding group of items. Furthermore, in the claims, unless otherwise explicitly specified, an operation described as being "based on" a recited item can be performed based on only that item, or based at least in part on that item. This document expressly envisions alternatives with respect to each and every one of the following claims individually, in any of which claims any "based on" language refers to the recited item(s), and no other(s). Additionally, in any claim using the "comprising" transitional phrase, recitation of a specific number of components (e.g., "two Xs") is not limited to embodiments including exactly that number of those components, unless expressly specified (e.g., "exactly two Xs"). However, such a claim does describe both embodiments that include exactly the specified number of those components and embodiments that include at least the specified number of those components.

What is claimed is:

1. At least one tangible, non-transitory computer-readable medium comprising instructions that, when executed by at least one processor, cause the at least one processor to perform operations comprising:
   receiving, via a communications interface from a network node, an authentication-control message;
   receiving an authentication request from a terminal;
   skipping, at least partly in response to the authentication-control message, an authentication operation with respect to the authentication request;
   detecting an overload or service-interruption condition;
   determining, in response, a second authentication-control message requesting authentication be carried out other than by the at least one processor; and
   sending the second authentication-control message to the network node.

2. The at least one tangible, non-transitory computer-readable medium according to claim 1, the operations comprising sending an authentication-acceptance message to the terminal at least partly in response to the authentication-control message.

3. The at least one tangible, non-transitory computer-readable medium according to claim 1, the operations further comprising:
   determining that a stored criterion is satisfied with respect to the authentication request; and
   skipping the authentication operation further in response to the stored criterion being satisfied.

4. The at least one tangible, non-transitory computer-readable medium according to claim 3, the operations further comprising:
   determining a random value associated with the authentication request; and
   determining that the stored criterion is satisfied by the random value.

5. The at least one tangible, non-transitory computer-readable medium according to claim 3, the operations further comprising:
   receiving a second authentication request from a terminal;
   determining that the stored criterion is not satisfied with respect to the second authentication request; and
   performing the authentication operation with respect to the second authentication request in response to the stored criterion not being satisfied.

6. A system, comprising:
   a first authentication node of a telecommunications network, the first authentication node associated with one of an access network and an application network and configured to authenticate a terminal; and
   a second authentication node of the telecommunications network, the second node being different from the first authentication node, the second authentication node associated with the other of the access network and the application network and configured to authenticate the terminal;
   wherein:
      the first authentication node is configured to:
         detect that a load level of the first authentication node satisfies a predetermined criterion; and
         in response:
            skip a first authentication operation at the first authentication node; and
            send a first message; and
      the second authentication node is configured to:
         receive an indication of the first message; and
         perform, in response, a second authentication operation at the second authentication node.

7. The system according to claim 6, wherein:
   the system further comprises a relay node of a telecommunications network;
   the relay node is communicatively connected with both the first authentication node and the second authentication node; and
   the relay node is configured to:
      receive the first message; and
      send, in response, a second message to the second authentication node, the second message comprising the indication of the first message.

8. The system according to claim 6, wherein:
   the first authentication node is configured to:
      skip the first authentication operation with respect to a first request from a first terminal; and
      perform the first authentication operation with respect to a second request from a second terminal; and
   the second authentication node is configured to:
      perform the second authentication operation with respect to a third request from the first terminal.

9. The system according to claim 6, wherein the first authentication operation comprises at least:
   sending a challenge to the terminal;
   receiving a challenge response from the terminal; or
   validating the challenge response.

10. The system according to claim 6, wherein:
    the relay node comprises a UDM;
    the first authentication node comprises an AMF; and
    the second authentication node comprises a CSCF.

11. The system according to claim 6, wherein:
    the relay node comprises an HSS;
    the first authentication node comprises an MME; and
    the second authentication node comprises a CSCF.

12. The system according to claim 6, wherein:
    the relay node comprises a UDM;
    the first authentication node comprises a CSCF; and
    the second authentication node comprises an AMF.

13. The system according to claim 6, wherein:
    the relay node comprises an HSS;
    the first authentication node comprises a CSCF; and
    the second authentication node comprises an MME.

14. A method comprising, by a relay node of a telecommunications network:
    receiving a first plurality of first requests from a first authentication node associated with at least an access network or an application network; and
    receiving a second plurality of second requests from a second authentication node that is different from the first authentication node;
    selecting the first authentication node based at least in part on the first plurality being associated with a higher load of the relay node than the second plurality;
    detecting an overload or service-interruption condition of the relay node;
    in response to the selecting of the first authentication node, determining, in response, a first authentication-control message; and
    sending the first authentication-control message to the first authentication node to cause the authentication node to skip at least one authentication operation.

15. The method according to claim 14, further comprising, by the relay node:
    determining a second authentication-control message;
    sending the first authentication-control message to the first authentication node associated with a first network of the access network and the application network; and
    sending the second authentication-control message to the second authentication node associated with a second network of the access network and the application network, the second network different from the first network.

16. The method according to claim 15, further comprising, by the relay node:
    determining the first authentication-control message directing the first authentication node to skip a first authentication operation with respect to at least seventy-five percent of first requests for service received by the first authentication node; and
    determining the second authentication-control message directing the second authentication node to perform a second authentication operation with respect to at least seventy-five percent of second requests for service received by the second authentication node.

17. The method according to claim 15, further comprising, by the relay node:
    determining the first authentication-control message directing the first authentication node to perform a first authentication operation with respect to fewer than all first requests for service from network terminal(s); and determining the second authentication-control message directing the second authentication node to perform a second authentication operation with respect to fewer than all second requests for service from network terminal(s).

18. The method according to claim 17, wherein at least:

the first authentication-control message specifies a percentage of the first requests for service with respect to which the first authentication operation should be performed; or the second authentication-control message specifies a percentage of the second requests for service with respect to which the second authentication operation should be performed.

\* \* \* \* \*